United States Patent Office 3,115,415
Patented Dec. 24, 1963

3,115,415
VITREOUS ENAMEL, ARTICLE AND METHOD
Lewis C. Hoffman, Wilmington, Del., assignor to E. I. du Pont de Nemours and Company, Wilmington, Del., a corporation of Delaware
No Drawing. Filed Jan. 26, 1962, Ser. No. 169,143
3 Claims. (Cl. 106—49)

This invention relates to a new and improved vitreous enamel, and more particularly it relates to a very low melting lead fluoro-borosilicate enamel frit consisting essentially of the four component system $$PbO—PbF_2—B_2O_3—SiO_2$$

There has long been a demand for a very low-melting, non-crystallizing vitreous enamel of good chemical resistance and suitable thermal expansion characteristics to render it suitable for use in encapsulating delicate electrical components and instruments and other articles that are sensitive to moisture or temperatures of over about 400° C.

This application is a continuation-in-part of my copending application Serial No. 74,235, filed December 7, 1960.

It is an object of this invention to produce a very low-melting vitreous enamel frit having a good chemical resistance.

It is another object of this invention to produce a vitreous enamel frit that can be fired at a temperature not to exceed about 400° C. and will have a desired coefficient of linear expansion varying between about 100 and $185 \times 10^{-7}$ cm./cm./° C.

It is another object of this invention to produce a vitreous enamel frit that is particularly suitable for use as an encapsulating glass on heat- and moisture-sensitive articles and instruments.

Other objects of the invention will appear hereinafter.

These and other objects may be accomplished by the preparation of vitreous enamel frits having a softening point of less than 350° C., a firing temperature of less than 400° C., good chemical resistance, a coefficient of linear expansion between about 100 and $185 \times 10^{-7}$ cm./cm./° C., and containing the following constituents within the following critical ranges and proportions:

| | Mol percent |
|---|---|
| PbO | 50 to 70 |
| $PbF_2$ | 10 to 30 |
| $SiO_2$ | 5 to 35 |
| $B_2O_3$ | 5 to 25 | wherein the sum of PbO and $PbF_2$ is between 60 and 85 mol percent.

Small percentages of other oxide ingredients such as normally present in enamel frits may be contained in the vitreous enamels of this invention. Such other enamel frit oxides should not be present in an amount to exceed 4% of any one other oxide or to exceed a total of 10% of such other oxides. The presence of $Al_2O_3$ is very objectionable in the enamels of this invention and must not be present in an amount greater than 1 mol percent.

It has been found in accordance with this invention that vitreous enamels having softening points of between 240 and 350° C. and having a good chemical and weathering resistance can be produced from the foregoing compositions within the ranges specified. Moreover, by slightly varying the proportions of the ingredients within the ranges specified, the coefficient of linear expansion of the resulting enamel can be varied between about 100 and $185 \times 10^{-7}$ cm./cm./° C. Enamels of this invention therefore are useful for the coating of substrates of quite different materials for example, substrates composed of glass, iron, steel, aluminum, copper, brass, precious metals and the like.

The enamel ingredients are expressed in mol percentages, however, for ready comparison with other compositions expressed in weight percentages, the examples will be set forth in both mol and weight percentages.

The following three tables disclose fifteen specific examples of compositions prepared in accordance with this invention. Table I discloses the compositions in mol percent, Table II in weight percent, and Table III in weight percent of the batch ingredients from which the vitreous enamel frit is prepared. Table I also discloses the thermal expansion coefficients of the examples.

TABLE I
*Melted Compositions—Mol Percent*

| | 1 | 2 | 3 | 4 | 5 | 6 | 7 | 8 | 9 | 10 | 11 | 12 | 13 | 14 | 15 | Limits | $PbO+PbF_2$ |
|---|---|---|---|---|---|---|---|---|---|---|---|---|---|---|---|---|---|
| PbO | 55 | 70 | 65 | 65 | 60 | 60 | 55 | 55 | 55 | 55 | 55 | 50 | 50 | 50 | 50 | 50–70 | 60–85 |
| $PbF_2$ | 30 | 15 | 20 | 10 | 14 | 10 | 20 | 15 | 10 | 10 | 10 | 30 | 15 | 15 | 10 | 10–30 | |
| $SiO_2$ | 5 | 5 | 5 | 10 | 15 | 15 | 10 | 20 | 25 | 10 | 15 | 10 | 30 | 15 | 25 | 5–35 | |
| $B_2O_3$ | 10 | 10 | 10 | 15 | 11 | 15 | 15 | 10 | 10 | 25 | 20 | 10 | 5 | 20 | 15 | 5–25 | |
| Softening Point, ° C. | 245 | 280 | 270 | 280 | 258 | 280 | 260 | 280 | 320 | 325 | 310 | 340 | 310 | 310 | 320 | | |
| $10^{-7}$ Thermal Expansion in cm./cm./° C. | 180 | 163 | 160 | 130 | 130 | 130 | 172 | 136 | 110 | 106 | 116 | 110 | 114 | 109 | 122 | | |

TABLE II
*Melted Compositions—Weight Percent*

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PbO | 59.5 | 76.9 | 71.1 | 78.0 | 72.4 | 75.2 | 65.2 | 68.8 | 72.5 | 71.8 | 72.1 | 56.3 | 65.7 | 65.0 | 69.0 |
| $PbF_2$ | 35.6 | 18.1 | 24.0 | 13.2 | 18.6 | 13.8 | 26.0 | 20.6 | 14.5 | 14.5 | 14.4 | 37.1 | 21.7 | 21.5 | 15.2 |
| $SiO_2$ | 1.5 | 1.5 | 1.5 | 3.2 | 4.9 | 5.1 | 3.2 | 6.7 | 8.9 | 3.5 | 5.3 | 3.0 | 10.6 | 5.3 | 9.3 |
| $B_2O_3$ | 3.4 | 3.5 | 3.4 | 5.6 | 4.1 | 5.9 | 5.6 | 3.9 | 4.1 | 10.2 | 8.2 | 3.6 | 2.0 | 8.2 | 6.5 |

TABLE III
*Batch Compositions—Weight Percent*

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PbO | 57.8 | 74.8 | 69.3 | 74.5 | 70.2 | 72.2 | 62.2 | 66.7 | 70.1 | 66.6 | 67.6 | 54.8 | 64.8 | 61.1 | 65.6 |
| $PbF_2$ | 34.6 | 17.6 | 23.3 | 12.7 | 18.0 | 13.2 | 25.0 | 20.0 | 14.1 | 13.3 | 13.5 | 36.0 | 21.3 | 20.0 | 14.4 |
| $SiO_2$ | 1.6 | 1.5 | 1.5 | 3.1 | 4.8 | 4.5 | 3.1 | 6.5 | 8.6 | 3.2 | 5.0 | 2.9 | 10.4 | 5.0 | 8.2 |
| $H_3BO_3$ | 6.0 | 6.1 | 5.9 | 9.7 | 7.0 | 10.2 | 9.7 | 6.8 | 7.2 | 16.9 | 13.9 | 6.3 | 3.5 | 13.9 | 11.8 |

In preparing the frits of the examples, the batch ingredients are weighed, mixed and heated in a crucible until the mix is completely melted to a homogeneous glass. Crucible temperatures may be varied within wide limits between 400 and 1200° C. The mixed ingredients must be heated until all the ingredients are molten to a homogeneous mass and all gas evolution ceases. The gas evolved consists of water vapor apparently due to moisture contained on the batch ingredients and from the decomposition of boric acid. No evolution of fluorine or fluorine-containing gas has been detected. Homogeneity can be judged in accordance with methods well understood in the art, for example, by drawing rods or threads from the melts and examining them for freedom from particles of unmelted or undissolved ingredients.

The softening temperatures of the examples were measured by anchoring one end of a glass rod, having a diameter of 1 millimeter, in a support with a three-centimeter length thereof projecting unsupported at a 45° angle from the horizontal. The glass rods, so anchored, were placed in a furnace preset at various temperatures and left therein for 15 minutes. The temperature at which the glass rod bent over to a horizontal position to touch the support was taken as the softening temperature. The softening point temperatures of the enamel frits set forth herein are given in Table I.

The thermal coefficients of linear expansion were measured with a fused silica dilatometer at a heating rate of 10 degrees per minute. The elongation was plotted against the temperature and the linear expansion coefficient taken as the slope from 25° C. up to the beginning of deformation of the three inch by ½ inch rod-shaped specimen under the load of the fused silica tube.

In the process of encapsulation the molten glass is preferably maintained at a temperature of 100 to 150° C. above the softening point thereof, however, if the object to be encapsulated is very sensitive to high temperatures then a temperature of 50° C. or over above the softening point can be used. The object is generally left in contact with the melt for 2 to 5 minutes to allow the object to be heated and to be melted by the molten glass. The object is then removed and, if necessary, placed in an annealing oven so that it may be slowly cooled through the transformation temperature of the glass. The compositions of this invention will all have sufficient stability for such dipping operation, as well as for solder glasses to fasten glass pieces together, or as enamel glasses in coating temperature-sensitive substrates.

The following additional examples are given to show the manner in which the enamel frits of this invention may be used to encapsulate different substances, and to enamel soft glass substrates.

EXAMPLE 16

Enamel frit composition No. 1 from the above tables was melted at 1000° C. for 30 minutes in a kyanite crucible. Its temperature was then lowered to 400° C. and objects composed of silver, gold, aluminum, copper and brass dipped therein and allowed to remain for 2 minutes to wet such objects. These objects were cooled in the atmosphere without thermal cracking.

Objects composed of platinum, iron and steel were similarly dipped in this melted composition but it was necessary to cool them at a rate of about 5 degrees centigrade per minute or less to minimize thermal cracking. Tungsten, steatite and kyanite objects were similarly coated with the same molten compositon but even overnight cooling in an annealing oven failed to prevent the development of some cracks.

The relatively high linear thermal expansion of frit composition No. 1 indicates its maximum usefulness for coating high expansion substrates although medium expansion substrates can be coated therewith if careful annealing is provided. If it is desired to coat or encapsulate low expansion materials, then a lower expansion frit is required. Frit composition No. 11 may be used to coat tungsten, steatite and kyanite at a dipping temperature of 450° C. with annealing at 5° C. per minute cooling without thermal cracking.

EXAMPLE 17

Frit composition No. 9 was melted at 1100° C. for 20 minutes and poured into water to shatter the same into the form of a course frit. This frit was placed in a ball mill with about one-third of its weight of water and ground until it all passed through a 200 mesh sieve. The resulting slurry was filtered and the solid material dried. The filter cake was redispersed in an organic screen squeegee vehicle composed of 95% by weight beta-terpineol and 5% ethyl cellulose at a weight ratio of 3.5 parts solid to 1 part vehicle. The resulting paste was squeegeed through a wire mesh screen onto a glass substrate, dried and fired to a transparent, colorless enamel at 370° C. for 10 minutes.

The enamel could be pigmented, to give any desired color, by the addition of a common ceramic pigment to the ball mill in which the frit is ground. Also, small amounts of known coloring agents may be dissolved in the original melt and fritted with the glass composition.

Surprisingly, the stability of these glasses is such that they can be severely overfired as enamels without crystallization or the development of opacity in any form. The enamel frit composition of Example No. 2 for example, may be fired up to 660° C. without deleterious effect. This same composition can be fired as low as 340° C. As the firing temperature increases, the transparency and surface perfection of the resulting enamel coating increases.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A vitreous enamel composition having a softening point of less than 350° C., a coefficient of linear expansion between 100 and $185 \times 10^{-7}$ cm./cm./0 C., said composition containing less than 1 mol percent of $Al_2O_3$ and consisting essentially of

| | Mol percent |
|---|---|
| PbO | 50–70 |
| $PbF_2$ | 10–30 |
| $B_2O_3$ | 5–25 |
| $SiO_2$ | 5–35 | and wherein the sum of PbO and $PbF_2$ is 60–85 mol percent, all of said oxides being molten into said enamel composition.

2. A process for applying a protective vitreous enamel coating on a heat-sensitive object, which comprises fusing thereon a vitreous enamel having a softening point of less than 350° C., a coefficient of linear expansion between 100 and $185 \times 10^{-7}$ cm./cm./° C., said composition containing less than 1 mol percent of $Al_2O_3$ and consisting essentially of

| | Mol percent |
|---|---|
| PbO | 50–70 |
| $PbF_2$ | 10–30 |
| $B_2O_3$ | 5–25 |
| $SiO_2$ | 5–35 | and wherein the sum of PbO and $PbF_2$ is 60–85 mol percent, all of said oxides being molten into said enamel composition.

3. An encapsulated object in which the encapsulation comprises a vitreous enamel composition having a softening point of less than 350° C., a coefficient of linear expansion between 100 and $185 \times 10^{-7}$ cm./cm./° C., said composition containing less than 1 mol percent of $Al_2O_3$ and consisting essentially of

|  | Mol percent |
|---|---|
| PbO | 50–70 |
| $PbF_2$ | 10–30 |
| $B_2O_3$ | 5–25 |
| $SiO_2$ | 5–35 | and wherein the sum of PbO and $PbF_2$ is 60–85 mol percent, all of said oxides being molten into said enamel composition.

References Cited in the file of this patent

UNITED STATES PATENTS

| 2,356,317 | Harbert et al. | Aug. 22, 1944 |
| 2,457,158 | Koch | Dec. 28, 1948 |
| 2,882,187 | Kwate | Apr. 14, 1959 |
| 2,906,907 | Peras | Sept. 29, 1959 |
| 3,055,762 | Hoffman | Sept. 25, 1962 |